United States Patent

Dupieux et al.

[15] 3,678,206

[45] July 18, 1972

[54] TDM SWITCHING NETWORK USING TIME SPACED CONTROL SIGNALS

[72] Inventors: Jacques Georges Dupieux, Issy-les-Moulineaux; Jean-Claude Gadre, Boulogne-Brillancourt, both of France; Jean-Pierre Le Corre, deceased, late of Sainte-Genevieve-Des-Bois, France by Yvette Marie Laurence Le Corre, administratrix; Jean Francois Pierre Julien Loisel, Versailles, France

[73] Assignee: International Standard Electric Corporation, New York, N.Y.

[22] Filed: Feb. 2, 1970

[21] Appl. No.: 7,477

[52] U.S. Cl. ....................179/18 J

[51] Int. Cl. ....................H04q 11/00

[58] Field of Search ....................179/15 AT, 18 J

[56] References Cited

UNITED STATES PATENTS

| | | | |
|---|---|---|---|
| 3,204,033 | 8/1965 | Adelaar | 179/18 J X |
| 3,479,466 | 11/1969 | Damiano et al. | 179/15 AT X |

*Primary Examiner*—Kathleen H. Claffy
*Assistant Examiner*—Thomas W. Brown
*Attorney*—C. Cornell Remsen, Jr., Walter J. Baum, Percy P. Lantzy, J. Warren Whitesel, Delbert P. Warner and James B. Raden

[57] ABSTRACT

The description covers the general organization of a switching network for a TDM exchange using PCM principles. The network comprises two selection stages and there is a particular grouping of the space, time and junctor memories which simplifies their access and which allows for a ready extension of the capacity of the network. The switching network may establish a special connection for the supervision of a traffic connection between a calling channel and an outgoing channel by using a junctor different from that used for the traffic connection. Thus in order to supervise the messages sent from the calling channel to the outgoing channel, there is established a first partial connection from the calling channel to the intermediate junctor on a first synchronous signal and using one address connection and a second partial connection from the junctor to the outgoing channel on an asynchronous signal spaced in time from said first signal, the channel having a second address. The two partial connections complete the connection through the switching network to complete the connection.

1 Claim, 25 Drawing Figures

*INVENTORS.*

*J. G. DUPIEUX*
*J. C. GADRE*
*J. P. LE CORRE, DECEASED*
*By Y. M. L. LE CORRE, ADMINISTRATRIX.*
*J. F. P. J. LOISEL*

Pl III/6

Pl. V/6

Pl. VI/6

TDM SWITCHING NETWORK USING TIME SPACED CONTROL SIGNALS

The present invention concerns improvements to time multiplex data switching centers and more particularly to centers of this type operating in pulse code modulation or "PCM".

Such centers have already been described in the following U.S. patents filed by the Applicants' assignee:

a. U.S. Pat. No. 3,049,593 issued Aug. 14, 1962 (E. Touraton et al.)

b. U.S. Pat. No. 3,281,536 issued Oct. 25, 1966 (J.G. Dupieux et al.)

c. U.S. Pat. No. 3,281,537 issued Oct. 25, 1966 (J.G. Dupieux et al.)

d. U.S. Pat. No. 3,439,124 issued Apr. 15, 1969 (J.G. Dupieux et al.)

In these patents there have been described several examples of systems in which a PCM switching stage enables the set up of a link between a given incoming channel of a multiplex trunk and a free outgoing channel of another multiplex trunk (or of the same trunk), the incoming and the outgoing channels occupying generally different time slots.

An improved switching center has been described further on in the following documents:

e. Review : "Electronics" of the Oct. 31, 1966 — Article by A. CHATELON titled : "PCM telephone exchange switches digital data like a computer" (pages 119 to 126).

f. Book : "Techniques of pulse-code modulation in communication networks" pages 97 to 102 (Cambridge University press — Edition of 1962).

In this improved commutation center one has described a switching network comprising a single stage which is designed for setting up connections between a number of group of trunks comprising each $g$ channels ($g = 192$, for instance); each connection being set up through one junctor among $j$. Such a connection is constituted by two half-connections which connect the junctor, respectively to the incoming channel and to the outgoing channel a half-connection being defined as a connection from a junctor in one direction, the full connection through the junctor requiring half-connections in both directions.

During a repetition period or frame, the main clock delivers a succession of codes Ct characterizing the time division of this frame in $g/2 = 96$ base time signals $t1$, $t2$ . . . $t96$. Each of these time intervals is divided in two equal parts in order to obtain two trains of 96 interlaced signals vizus : the synchronous time signals $t$S1, $t$S2 . . . $t$Sx . . . $t$S96 and the asynchronous time signals $t$A1, $t$A2 . . . $t$Ay . . . $t$A96.

For a given connection, one of the two half-connections is set up at a synchronous time $t$S and the other at an asynchronous time $t$A, the indices of which are generally different.

A connection requires the occurrence at each frame of :

1. A time switching in the junctor for matching the time positions (these are different, even if the times S and $t$A bear the same index), and
2. Space switching for each of the half-connections for setting up the electrical connection between each of the groups and the junctor.

The time switch located in a junctor comprises first a data memory MDJ wherein each address is reserved to a connection and second a time path memory MCT; these two memories comprising each $g/2$ lines.

At each frame, in order to control the setting up of a given connection, the MDJ memory is addressed at the times $t$S in a cyclic way under the control of the code Ctx read in an address of the memory MCT the addressing of which is also cyclic.

The time switching will be described in a simplified way for a connection established between the channel $x$ of the group G1 (channel G1:$t$Sx) and the channel $y$ of the group G2 (channel G2:$t$Ay), this connection using the junctor $j$5 (connection G1:$t$Sx/J5/G2:$t$Ay).

The line $x$ of the junctor J5 is assigned to this connection and the time code Ctx defining the address $x$ of the memory MDJ is stored in the line $y$ of MCT.

At time $t$Sx the line $x$ of the memory MDJ is selected and the half-connection G1:$tx$ is established. This latter is effected by a bi-directional data transfer between the junctor J5 and the group G1, the reception of the message in the junctor being carried out last. At time $t$Ay, the line $y$ of the memory MCT is selected and the code Ctx which is read, controls again the selection of the line $x$ of the memory MDJ for the setting up of the half-connection G2:$ty$. This latter is effected by a bi-directional data transfer between the junctor J5 and the group G1, the first message transmitted being that received, at time $t$Sx, from the group G1.

It is thus seen that the time switch enables a match of the time positions of the incoming and outgoing channels by delaying the data received from G1 from time $t$Sx to time $t$Ay and the data received from G2 from time $t$Ay to time $t$Sx.

The space switch is constituted by several electronic multiselectors addressed by the information written either in synchronous space path memories MSS when one has to set up a synchronous half-connection (G1:$t$Sx), or in asynchronous space path memories MSA when one has to set up an asynchronous half-connection (G2:$t$Ay). Such a switch enables the carrying of the connection between different groups of trunks, such as G1 and G2.

The traffic capacity of a single stage switching network such as described in the referenced documents (e) and (f) is not sufficient when there are a high number of channels. This is the reason why, the present invention uses a two-stage switching network.

Each stage is constituted by several multiselectors Q'1, Q'2, etc. for the first stage; Q1, Q2, etc. for the second stage which comprise each $h$ inlets and $v$ outlets. The groups of trunks connected to the inlets of the multiselector of the first stage, Q'1 for instance, constitutes a super group SG1 and the $v$ outlets of the multiselector of the second stage Q1 for instance, are connected to $y$ trunks constituting the superjunctor SJ1.

The space path memories which control these multiselectors are grouped "horizontally" and placed in the corresponding superjunctor. Thus the superjunctor SJ1 comprises, besides the data memory MDJ and the time path memory MCT, the space path memories MSS and MSA associated to the multiselectors Q'1 and Q1.

It is realized that the connection between two channels belonging to different supergroups SG1, SG2 and using a superjunctor SJ3 located at a different horizontal level requires the access to three superjunctors SJ1, SJ2, SJ3 for placing the information in the path memories.

Nevertheless, these operations are performed in a very short time under the control of a computer and the horizontal distribution of the memories present a certain number of important advantages. In effect, it enables modularizing the memories, each module or extension unit grouping, such as, the four space path memories associated to the first outlet of the multiselectors Q'1, Q1 and the memories MDJ, MCT of the junctor associated to the first outlet of Q1.

Such an extension unit is organized as an independent unit having its own supply and its own distribution of time signals synchronized on the signals supplied by the main clock, so that, first, a defect in this extension unit affects only a limited number of equipments and, second, the capacity of the switching network may be easily increased by adding new units.

Besides, the switching network according to the invention enables to set up several different types of half-connections, such as :

The traffic half-connection connecting a channel to the address of a junctor bearing the same index or a different index and enabling a bi-directional data exchange.

The tone half-connection connecting a channel $x$ to a tone generator located in the junctor controlled by informations stored in the address $x$ of the memory MDJ or MCT of said junctor.

The supervision half-connection by which a supervision unit is connected on the path used for a connection between two channels.

The multiple half-connection through which a channel $x$ of a group of trunks is connected to the address $x$ of each one of the junctors of a superjunctor.

In the above description we have described the setting up of a connection between an "incoming channel" and an "outgoing channel" belonging to two different trunks.

In practice, one distributes, according to the invention, the $p$ trunks of a group in $p/2$ even trunks and $p/2$ odd trunks and one may choose one of the following organization modes:

1. The trunks are specialized according to the direction of the propagation of the call, the odd trunks being calling and the even trunks being called. Under these conditions, the odd trunks are always connected in $t$S and the even trunks are always connected in $t$A (or reversely). If each multiselector comprises $h$ inlets, a supergroup comprises $h$ groups of trunks.

2. The trunks are not specialized and each trunk may be connected either in $t$S or in $t$A. A supergroup comprises then $h/2$ groups of trunks.

The object of the present invention is thus to achieve a PCM data switching center having a high traffic capacity and presenting a high reliability.

In a PCM switching center, the setting up of a connection between a calling channel $x$ and a channel $y$ belonging to a called trunk implies the simultaneous performance of two space switchings (one for each channel) for directing the messages received on these channels towards a same junctor and a time switching carried out in the same junctor which enables the matching of the time positions of the two channels which are usually different and. Within this framework, one important feature of the invention is that (1) the messages transmitted in series and in time multiplex over each of the $m$ incoming and outgoing channels of each trunk comprise each $p$ digits, (2) that a supermultiplex with $g = p \times m$ channels is constituted by associating $p$ trunks in a group of trunks, the messages being then transmitted in parallel, (3) that the trunks are shared into odd trunks and even trunks specialized respectively as calling trunks and as called trunks (or reversely), that (4) each group of trunks is connected to an inlet of one of the multiselectors Q'1, Q'2 . . . Q' of a first selection stage, that the switching network in which are carried out the space switchings comprises, besides the first stage, a second stage which is connected in such a way as to carry out a mixing and which comprises the multiselectors Q1, Q2 . . . Qn2 and that (5) each outlet of a multiselector of the second stage is connected to a junctor in which the time switching is carried out.

Another feature of the invention is that in the case where each selection stage comprises the same number of identical multiselectors having each the same number of inlets $h$ and outlets $v$, the switching center comprises as many groups of trunks as there are junctors, that, in each multiselector, the crosspoints associated with each outlet are controlled by codes stored in synchronous space path memory MSS assigned to the message space switching of the calling channels and in an asynchronous space path memory MSA assigned to the message space switching of the called channels, the reading of the said memories being carried out in a cyclic way and the codes read being used under the control, respectively, of signals $t$S and $t$A supplied in an interlaced manner by the clock of the center, that each trunk comprises, for the time switching, a data memory MDJ and a time path memory MCT which are read cyclically, that at times $t$S the memory MDJ is addressed cyclically and that at times $t$A this memory is addressed in an asynchronous way under the control of the codes read cyclically in the memory MCT, that each of the memories MSS, MSA, MCT, MDJ comprises $g/2$ lines, that each connection between a calling channel $x$ and a called channel $y$ comprises two half-connections which are established respectively at time $t$Sx for a bidirectional transfer of messages between the channel $x$ and the line $x$ of the memory MDJ and at in $t$Ay for a bidirectional transfer of messages between the channel $y$ and the line $x$ of the memory MDJ, that each junctor, such as that associated to the outlet 1 of the multiselector Q1, comprises, besides the memories MDJ and MCT, the memories MSS', MSA' associated to the outlet 1 of Q'1 and the memories MSS, MSA associated to the outlet 1 of Q1, that the synchronous selection of the whole assembly of these memories is carried out through one single selector and that the whole assembly of these memories horizontal grouping constitutes an independent extension unit having its own supply and its own clock synchronized over the main clock.

Another feature of the invention is that the codes exchanged between the calling and the called channels are messages which are written alternatively in the memory MDJ in the case of a traffic connection, that the switching center may also set up tone half-connections between a channel $x$ of a trunk and a line $x$ of a junctor by storing the selection code Cn of a tone source TN in the line $x$ of the memory MDJ if the channel $x$ is calling or in the line $x$ of the memory MCT if it is called, that the introduction of the codes in the memory MDJ is blocked at each time $tx$ and that the reading in $t$Sx ($t$Ax) of the code Cn in the memory MDJ (MCT) controls the selection of the source TN and the sending of the tone over the channel $x$.

Another feature of the invention is that the switching center may establish a special half-connection for the supervision of a traffic connection between a channel $x$ and a channel $y$ by using a junctor Ja different from that used for the traffic connection, that in order to supervise the messages sent, for instance, from the calling channel $x$ to the channel $y$, there is established a first half-connection in $t$Sx between a free outlet of one of the two multiselectors used by the traffic half-connection, and a second half-connection, at a time $t$Az, between this line and a multiplex supervision unit which is free at that time so that the messages received over the channel are also transmitted to said unit.

Another feature of the invention is that, as an alternative, the trunks are not specialized, and that the even and odd trunks are connected separately to an inlet of a multiselector of the first stage so that each channel may be connected to a junctor either at a time $t$S or at a time $t$A.

Another feature of the invention is that, as an alternative, there is made a mesh-grouping of the memories so that, for $n1 = n2 = 8$, an extension unit comprises the memories MDJ, MCT, MSS, MSA associated, for instance, to the outlet 1 of the multiselector Q8 and the memories MSS', MSA' associated at the outlet 8 of the multiselector Q1.

Other objects, features and advantages of the present invention will appear at the reading of the following description of an example of achievement, said description being carried out in relation with the annexed drawings in which:

FIGS. 1.$a$ to 1.$g$ represent the diagrams of the clock signals,

Figures 6A, 6B, 6C, 6D, 6E, 6F:
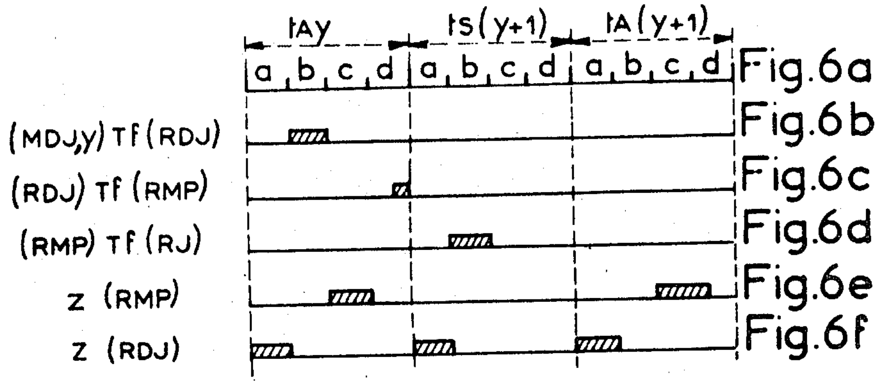
Figure 7:
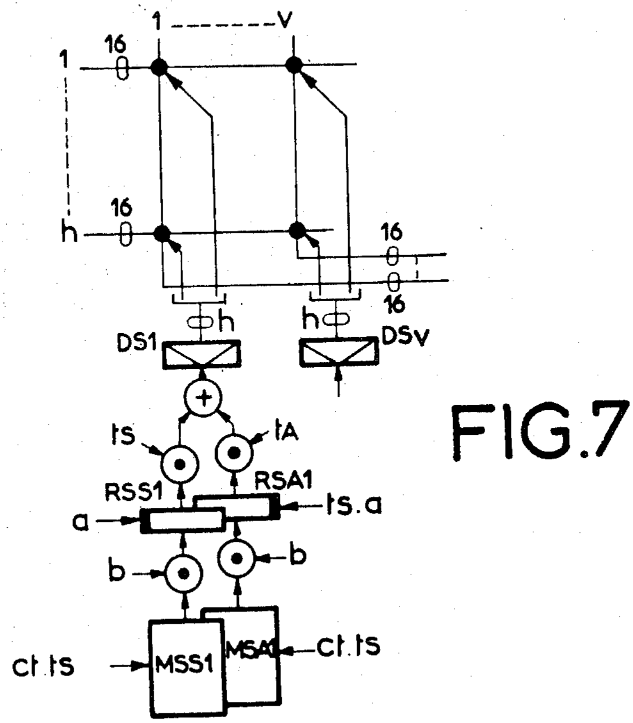
Figure 9:
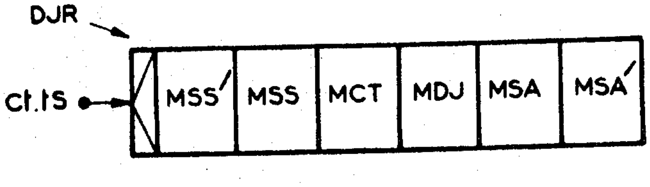
Figure 14:
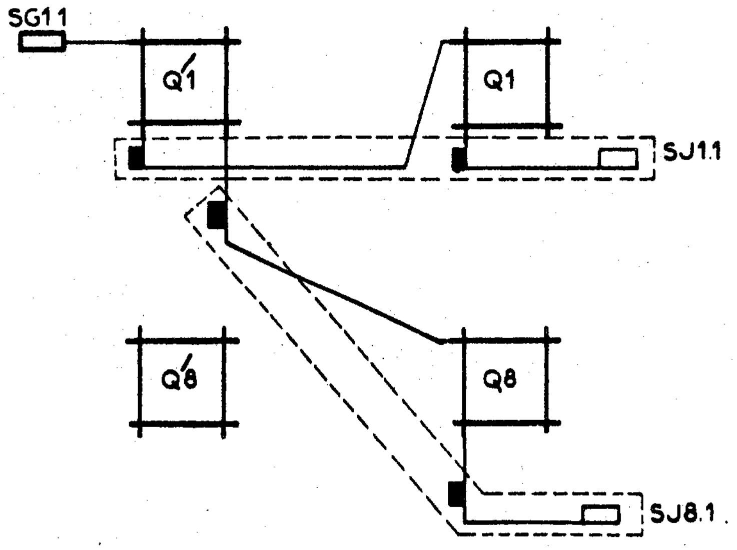
Figure 8:
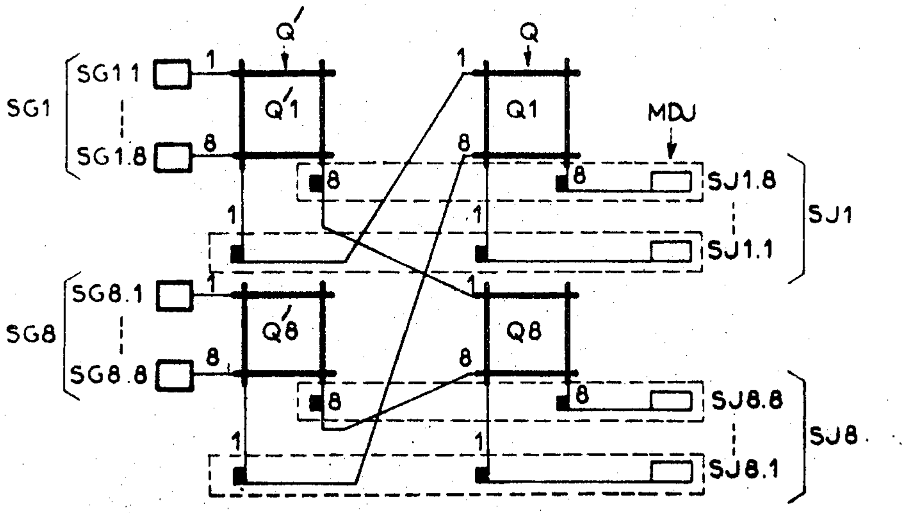
Figure 10:
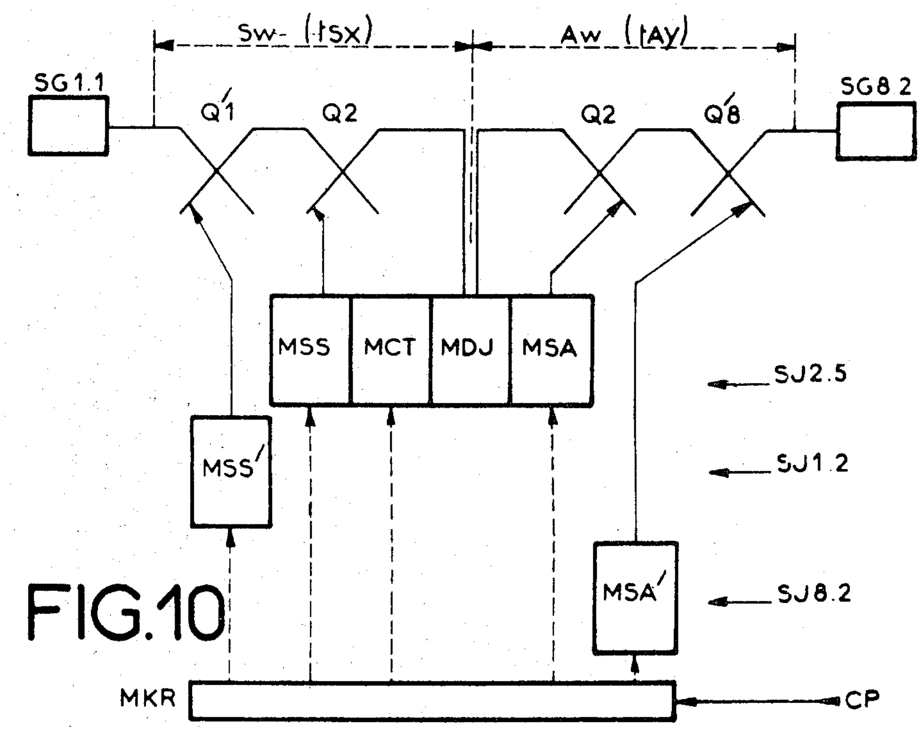
Figure 11:
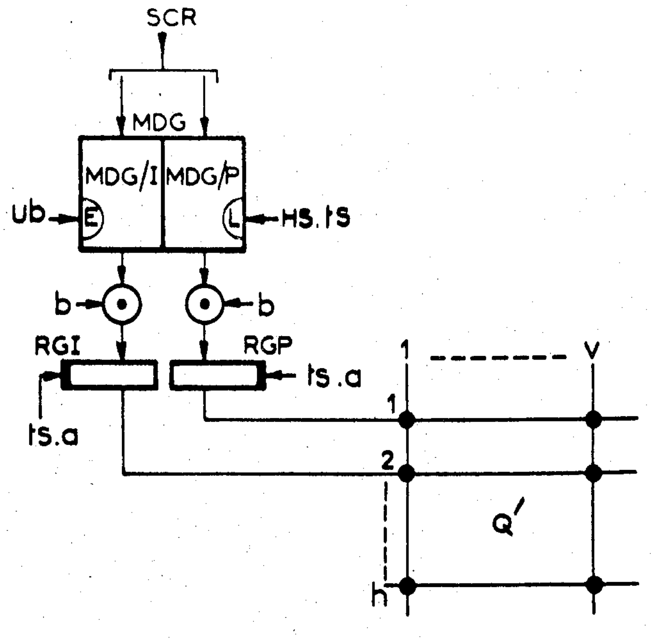
Figure 12:
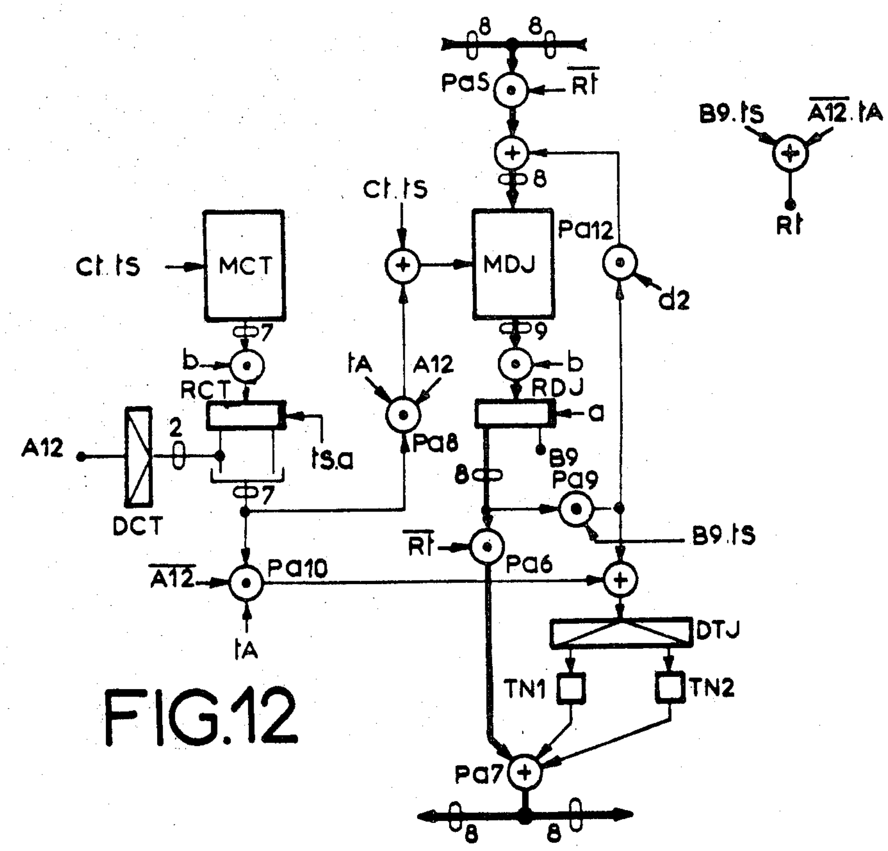
Figure 13:
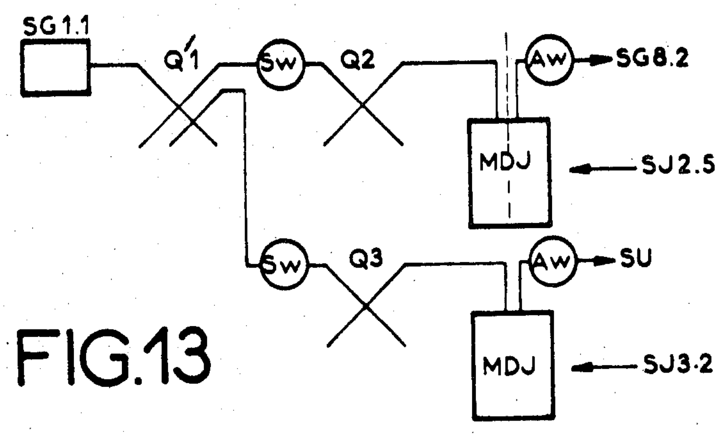

FIGS. 6.$a$ to 6.$f$ represent the diagrams of signals related to the operation of a demultiplexer, FIG. 7 represents the diagram of the control circuit of a multiselector, FIG. 8 represents the general diagram of the switching network with horizontal grouping of the memories, FIG. 9 represents the grouping of the memories constituting an extension unit, FIG. 10 represents an "unfolded" symbolic diagram for a connection, FIG. 11 represents a particular mode of connection of a group data memory to a multiselector, FIG. 12 represents the detailed diagram of a junctor, FIG. 13 represents the symbolic diagram of a supervision half-connection, FIG. 14 represents the general diagram of a switching network with mesh-grouping of the memories.

In order to facilitate the description, this description has been divided into seven titled paragraphs as follows:

1. Definitions
2. Input circuits of the switching center
3. Time switching
4. Space switching
5. Modes of connection of the trunks
6. Types of half-connections
7. Grouping of the memories

1. DEFINITIONS

The switching network according to the invention will be described, by way of example, in its application to a PCM system the main characteristics of which are given in Table 1. The diagrams of the clock signals are given in the figures 1.*a* to 1.*f*.

Figures 1A, 1B, 1C, 1D, 1E, 1F, 1G, 2, 3, 4:
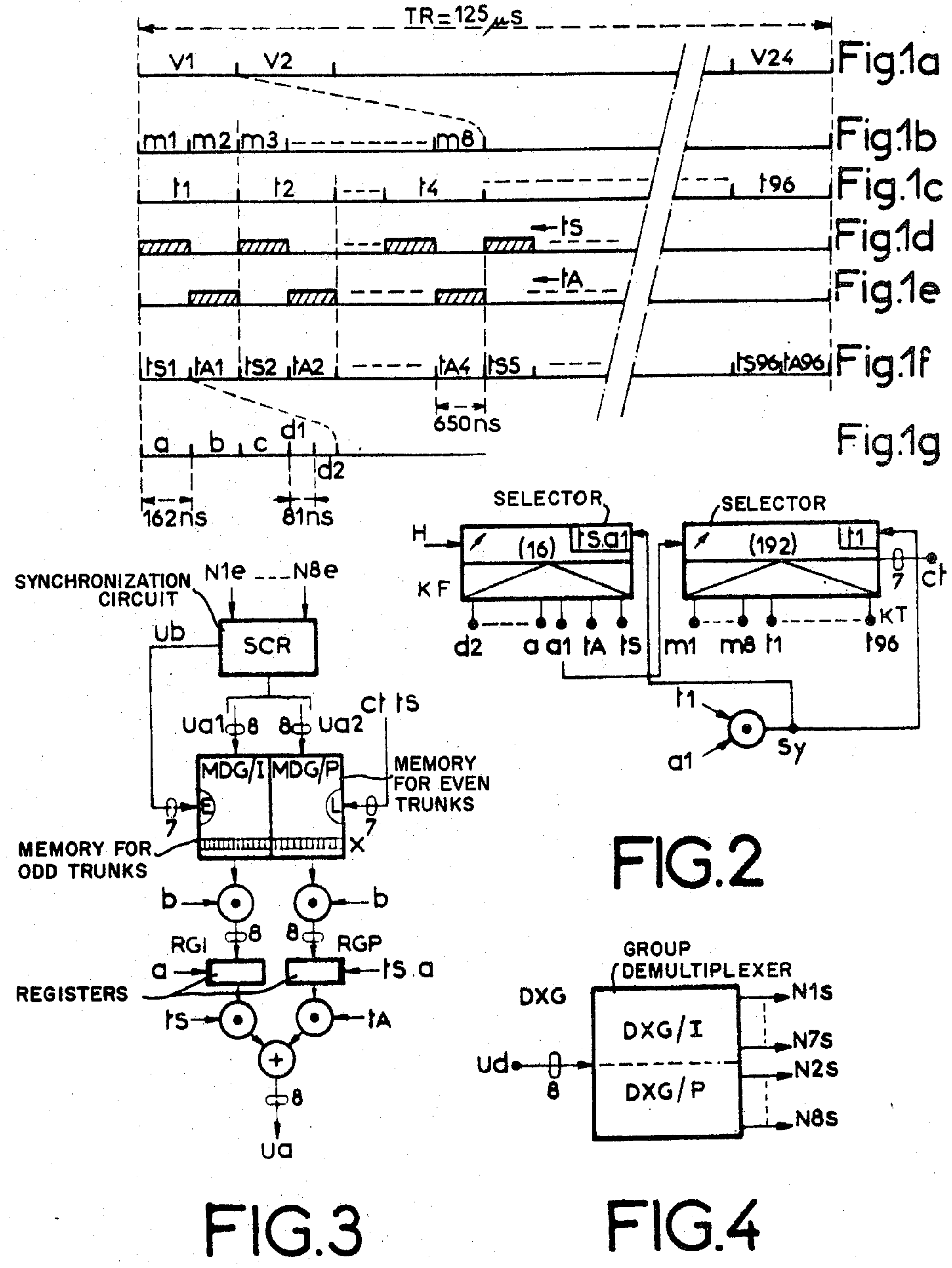
FIG. 2 represents the diagram of a clock.
FIG. 3 represents the group data memory.
FIG. 4 represents a group demultiplexer.

This time data is delivered by a main clock of well known design which is represented, in a simplified way, on FIG. 2. It comprises an oscillator (which is not shown) delivering signals H of period 81 ns out of which other signals are obtained by successive divisions carried out by means of the selectors KF and KT.

The selector KF comprises a 16-position counter (four flip-flops) and it advances under the control of the signals H. Its three less significant flip-flops supply the fine and ultra-fine time signals (FIG. 1.*g*) and the state of its most significant flip-flop gives the synchronous time information *t*S (FIG. 1.*d*) or *t*A (FIG. 1.*e*). It will be noted that this selector supplies an ultra-fine time *a*.1 of duration 81 ns which is not shown on the FIG. 1.*g*. This signal is used for elaborating a time base synchronizing signal which will be defined below.

TABLE 1

Characteristics of the PCM system and of the clock signals (exchange time base HS)

| Symbol | Unit duration | Cycle duration | | FIG. |
|---|---|---|---|---|
| TR | 125 µs | | Duration of the repetition period or frame (sampling frequency:8 kHz) | 1.*a* |
| *m* | | | Number of channels in a trunk (*m*=24 | |
| V1, V2 .. V24 | ≈5,2 µs | 125 µs | Channel time slot | 1.*a* |
| *p* | | | Number of digits of a message and number of junctions in a group (*p*=8) | |
| *m*1, *m*2 . . . *m*8 | 650 ns | 5,2 µs | Digit time-slot | 1.*b* |
| *t*1 . . . *t*96 | 1300 ns | 125 µs | Base time-slot | 1.*c* |
| C*t* | | | The set of 96 base time-slot codes delivered by the counter KT (FIG. 2) | |
| *t*S | 650 ns | | Synchronous time-slots | 1.*d* |
| *t*A | 650 ns | | Asynchronous time-slots | 1.*e* |
| *t*S1 . . . *t*S96 | 650 ns | 125 µs | Interlaced sets of signals | |
| *t*A1 . . . *t*A96 | 650 ns | 125 µs | *t*S and *t*A | 1.*f* |
| *a*, *b*, *c*, *d* | 162,5 ns | 650 ns | Fine time-slot signals | 1.*f* |
| *a*1, *a*2(*d*1, *d*2) | ≈81 ns | 162,5 ns | Ultra-fine time-slot signals dividing a signal *a* (*d*) into 2 equal time-slots | 1.*g* |
| C*t*.*t*S | | | Cyclical selection at times *t*S | |

The selector KT comprises a counter with eight flip-flops A1, A2 . . . A8 and it is limited to 192 positions by the interdiction of showing the 64 codes, the two most significant digits of which A1 and A2 are equal to zero. The 96 codes constituted by the digits A1 to A7 and the two first digits of which satisfy to the logical condition A1 + A2 = A12 appear in time succession over the group of seven conductors Ct (codes of basic time), said codes being also decoded for supplying the signals *t*1 to *t*96. Besides the independent decoding of the digits A6, A7, A8 supplies the digit time slot signals *m*1 to *m*8 (FIG. 1.*b*).

It will be seen, in the paragraph 7, that each junctor constitutes an independent unit or extension unit comprising a time base identical to that which has just been described but which is synchronized over this latter. The synchronization is controlled by a signal Sy = *t*1.*a*1 defining the beginning of a frame and which acts as follows:

The selector KF is forced to the position corresponding to a time slot *t*S.*a*1, The selector KT is forced to the position corresponding to the basic time *t*1.

The shortest time signal supplied by the clock which has just been described has a duration of 81 ns. It will be assumed that the circuit uses conventional integrated circuits with response times *t* for one gate and 3*t*, at the most, for a flip-flop with $t \leqslant 10$ ns. Thus, when, for instance, an information is transferred in a register through a multiple gate, it is available in this register at most 40 ns after the beginning of the control signal and it may be exploited under the control of same signal, even if said signal is an ultra-fine time signal.

Table 2 represents several symbols which will be used in the description of the invention.

The part 1 of this table groups symbols related to the trunks, to the junctors and to the multiselectors of the switching network. Part 2 shows symbols which will be used for representing the half-connections. Last, part 3 groups the symbols of the elementary logical functions. A gate which fulfills one of these functions will be represented, on the figures, by a circle inside which the corresponding symbol will be shown. When a gate controls the transfer of a *p*-digit code, it is constituted by *p* gates controlled by the same signal. In practice, in order to simplify the drawings, no particular symbol has been provided to represent such multiple gates, but, when this becomes necessary for the understanding, the number of digits transmitted has been written close to the inlet and/or outlet conductor.

TABLE 2

Symbols used in the description

| | Symbol | Meaning |
|---|---|---|
| | N1, N2 . . . Np | References of the trunks in a group |
| | V3·N1 | Channel time slot V3 in trunk N1 |
| | n1*e* | Incoming line of trunk N1 |
| | N1*s* | Outgoing line of trunk N1 |
| | *g* | Number of channels per trunk group g=m×p=192 (supermultiplex) |
| | *h* | Number of inlets of a multiselector |
| 1 | G1, G2 . . . Gh | References of the trunk groups connected to a multiselector (supergroup) |
| | SG1, SG2 . . . | References of the supergroups |
| | SG1.3 | Group G3 of the supergroup SG1 |
| | *v* | Number of outlets of a multiselector |
| | J1, J2 . . . Jv | References of the junctors connected to a multiselector (superjunctor) |
| | SJ1, SJ2 . . . | References of the superjunctors |
| | SJ5·1 | Junctor J1 of the superjunctor SJ5 |
| | ":" | Definition of a channel. The channel *x* of group G1 is referenced G1:*tx* |
| 2 | "/" | Half-connection. The half-connection between G1:*tx* and the junctor J2 is referenced G1:*tx*/J2 |
| | "." | Logical AND function |
| 3 | "+" | Logical OR function |
| | "X" | Logical exclusive OR function (addition module 2) |

| | |
|---|---|
| $m1$–$m8$ | Equivalent to the logical condition $m1+m2+m3\ldots+m8$ |

Last, some of the gates shown on the figures do not carry references as they are sufficiently defined either by the description or by the logical equations summarizing their operation.

2. INPUT CIRCUITS OF THE SWITCHING CENTER

A PCM switching center enables the establishment of connections between a given channel $x$ of a calling trunk and a free channel in another trunk (or in the same trunk). As it may be seen on FIG. 1*a* each trunk is the support of $m$ time multiplex channels and it comprises, seen from the switching center, an incoming line (reception of messages) and an outgoing line (transmission of the messages).

When message signals are transmitted from the switching center B towards the center A they are synchronized, in the center B, on the time base HS (digit time slot signals, FIG. 1*b*) set up by the main clock of the center which is not in synchronism with that of the center A. In the center A, the time base HJ of the received signals, which is obtained by means of a regenerative repeater, drifts with respect to the time base HS of this center (signals supplied by the main clock, FIG. 2), this phenomena being called the slow fluctuation or drift. Besides the received signals are also affected with a phase jitter due to the variations of the propagation conditions.

Last, it is necessary to mark the time position of the channels for allowing their identification. Therefore one transmits periodically, in the center A, a synchronization code CSy having a time position which is perfectly defined with respect to that of the different channels. When this time position varies or when the code CSy is not detected in the center A, there occurs a framing loss.

To obviate the effects of the drift, of the phase jitter and of the framing loss, there is associated, to the incoming lines, a synchronization circuit SCR,two examples of which have been described in the U.S. patent and patent application thereunder mentioned:

g. U.S. Pat. No. 3,524,937 issued Aug. 18, 1970 (M.J. Herry et al.

h. U.S. Pat. application Ser. No. 5,381 filed Sept. 12, 1969 now abandoned. (M.J. Herry et al.

These circuits control the matching of the time base HJ to the time base HS at the expense of a slight loss of information.

The circuit described in the patent referenced (g) is adapted to a PCM network wherein one of the channels —the channel V24 for instance —is reserved to the transmission of the code CSy.

That described in the patent application reference *h*) is adapted to a PCM network wherein the code CSy is distributed over a multiframe comprising several frames. More precisely the description concerns, by way of example, a system in which:

A multiframe comprises four frames TR1 to TR4,

The code CSy comprises 16 digits,

Each digit of this code occupies the digit time slot $ml$ of the channels V9 to V24 of the frame TR2.

As it has been mentioned hereabove, the synchronization circuits are associated with the incoming lines. More precisely —and as it has been described in the patents referenced (g) and (h) —one associates a synchronization circuit SCR to the incoming lines of a group of trunks comprising $p$ trunks, this circuit controlling moreover the series-parallel conversion of the digits of the messages.

This circuit SCR enables thus the transformation of a system of single multiplex trunks comprising each m channels on which the information is present in series form (each eight-digit message occupies one of the digit time slots $m1$ to $m8$ of a channel time slot) into groups of trunks in supermultiplex with $g = p \times m$ channels in which the information is present in parallel form, each of the digit time slots $m1$, $m2$ . . . m8 being assigned to one of the trunks N1, N2 . . . N8. At each frame, the synchronization circuit delivers the messages of $g = 192$ incoming channels but, since the channels of the different trunks are not in synchronism, these messages are written, in their order of arrival, in addresses which are individually assigned to them in a buffer memory or group data memory MDG which is associated to the incoming lines.

FIG. 3 represents this memory which is of the DRO type (destructive read-out) and which is divided in two parts: the memory of the odd trunks MDG/I and the memory of the even trunks MDG/P each one comprising $g/2 = 96$ lines and each line having a capacity of $p = 8$ digits. The write selection in this MDG memory is asynchronous (random-access) and is controlled by a selection code delivered by the synchronization circuit over the group of conductors Ub connected to the inlet "E" of the memory. The messages are applied to the memory over the inlets Ua1 and Ua2.

In one mode of operation of the switching center, the trunks are specialized, according to the direction of the call, into calling trunks connected to a junctor in a time *t*S and in called trunks which are connected to a junctor at a time *t*A. On FIG. 3, the memory MDG/I stores the messages received over the calling trunks N1, N3, N5, N7 (odd trunks) and the memory MDG/P contains the messages received over the called trunks N2, N4, N6, N8 (even trunks).

The addressing of the memory MDG for read-out is carried out in a cyclic way at the times tS, as indicated on FIG. 3, by the seven-digit cyclic selection codes referenced Ct.*t*S (see Table 1) which are applied to the inlet "L" of the memory.

In order to simplify the figure, the decoding circuit which controls the write and read address selection has not been shown.

The read-out is carried as follows: in *t*S*x* the line $x$ of the memories MDG/I and MDG/P is selected by the code Ct and the two eight-digit messages which are stored in this address are transferred into the registers RGI and RGP at the fine time *b*. They are then transferred towards the switching network over the group of eight conductors Ua, the code read in MDG/I being transferred in *t*S and that read in MDG/P being transferred in A. The writing is carried out at the ultra-fine time $d2$ by means described in the patent application which was hereabove referenced *h*).

Table 3 gives the assignment of the channels 1 to 192 of the supermultiplex (column 1) to the addresses 1 to 96 of each one of the two incoming line data memories (columns 2 and 3). Last, columns 4 and 5 show the assignment of these addresses to the different channels of the trunks and the column 6 indicates the synchronous and asynchronous processing times of the messages read in these addresses.

The message of the channel V1.N1e may be received, as it has been seen previously, at any time in the frame and it is read in *t*S1 so that the memory MDG brings a variable delay having a maximum duration of one frame. The messages are transmitted through a switching network and one must, at the output of this network, direct the message towards the outgoing lines of the trunks.

FIG. 4 represents the demultiplexing circuit of the group DXG used to this effect which comprises the circuits DXG/I and DXG/P assigned respectively to the outgoing lines N2s, N4s . . . N8s of the calling trunks N1, N3, N5, N7 and to the outgoing lines of the called trunks N2, N4, N6, N8. These circuits will be described in a detailed manner in relation with FIG. 5.

3. TIME SWITCHING

As it has been seen previously a connection requires a time switching performed in a junctor and two space switchings performed in the switching network.

TABLE 3

System with specialized trunks

Addresses

| Super-multi plex | in MDG MDG/I | MDG/P | Channels in MDG/I | in MDG/P | Read-out time | Processing trunk time slot |
|---|---|---|---|---|---|---|
| 1 | 1 | | V1.N1*e* | | *t*S1 | *m*1 |
| 2 | | 1 | | V1.N2*e* | *t*A1 | *m*2 |
| 3 | 2 | | V1.N3*e* | | *t*S2 | *m*3 |
| 4 | | 2 | | V1.N4*e* | *t*A2 | *m*4 |
| 5 | 3 | | V1.N5*e* | | *t*S3 | *m*5 |
| 6 | | 3 | | V1.N6*e* | *t*A3 | *m*6 |
| 7 | 4 | | V1.N7*e* | | *t*S4 | *m*7 |
| 8 | | 4 | | V1.N8*e* | *t*A4 | *m*8 |
| 9 | 5 | | V2.N1*e* | | *t* S5 | *m*1 |
| . | . | . | . | . | . | . |
| . | . | . | . | . | . | . |
| . | . | . | . | . | . | . |
| 95 | 48 | | V12.N7*e* | | *t*S48 | *m*7 |
| 96 | | 48 | | V12.N8*e* | *t*A48 | *m*8 |
| 97 | 49 | | V13.N1*e* | | *t*S49 | *m*1 |
| . | . | . | . | . | . | . |
| . | . | . | . | . | . | . |
| . | . | . | . | . | . | . |
| 191 | 96 | | V24.N7*e* | | *t*S96 | *m*7 |
| 192 | | 96 | | V24.N8*e* | *t*A96 | *m*8 |
| 1 | 2 | 3 | 4 | 5 | 6 | 7 |

Figure 5:
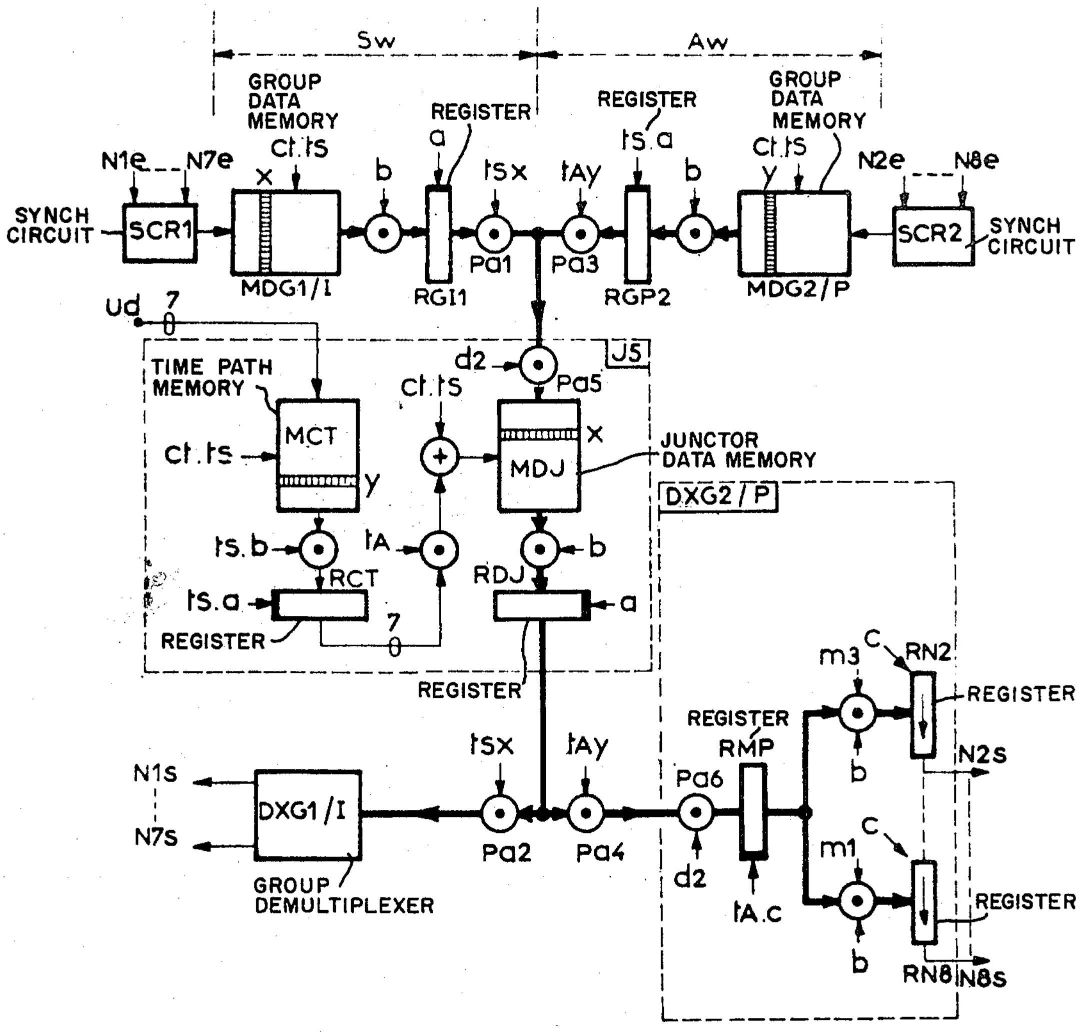
FIG. 5 represents a diagram for the study of the time switching.

FIG. 5 represents, in a simplified way, the circuits used for carrying out the time switching for setting up the connection G1:*tx*/J5g2:*ty*. This figure, in which the paths followed by the messages have been drawn with heavy lines, represents:

The synchronization circuits SCR1, SCR2 associated with the incoming lines of each group of trunks, The group data memories MDG1/I, MDG2/P associated to the incoming lines of the trunk groups G1 and G2 and which are those concerned by this connection, The group demultiplexers DXG1/I, DXG1/P associated to the outgoing lines of these groups, The junctor J5 which comprises the junctor data memory MDJ and the time path memory MCT.

The four memories represented on the figure comprise *g*/2 = 96 lines and they are cyclically read at times *t*S (symbol Ct.*t*S).

The information read is written at the fine time *b* in the output register of the memory (RGI1, RGP2, RCT, RDJ) and it is available during the fine times *c* and *d*. The registers are cleared at the time *a* or at the time *t*S.*a*.

As it has been seen previously, the data memories are of the DRO type and they store eight-digit messages, so that the paths drawn in heavy lines on the figure are constituted by groups of eight conductors on which are located AND multiple circuits.

The time path memory MCT is of the NDRO (non-destructive reading) type and the codes may be written therein, by way of example, under the control of a marker such as it is described in the patent referenced (b). These codes, which must select a line among 96 in the memory MDJ, are chosen among the codes Ct supplied by the clock represented on FIG. 2.

The connection G1:*tx*/J5/G2:*ty*, which will be studied by way of example, requires the alternate setting up of the two half-connections G1:*tx*/J5 and G2:*ty*/J5. We shall assume that the first of these half-connections is established in *t*Sx (synchronous) and the second one in *t*Ay (asynchronous).

In order to carry out this alternate setting up of the two half-connections, the memory MDJ of junctor J5 is selected first at each time *t*Sx (obtained by decoding the codes Ct.*t*S) and second, at each time *t*Ay, by means of a code read in the memory MCT.

Thus, in the case of the example, the line *x* of the memory MDJ is selected twice at each frame, first at time *t*Sx and second at time *t*Ay by the code Ctx (address code of the line *x*) read in *t*Sy in the line *y* of the memory MCT.

At time *t*Sx, the lines *x* of the memories MDG1:I and MDJ are thus selected simultaneously and the reading is carried out at the fine time *b*. The messages are transferred respectively, at this fine time, in the registers RGI1 and RDJ. At time *t*Sx.*d*2 (gates Pa1 and Pa5), the message stored in RGI1 is transferred on the line *x* of MDJ and that stored in RDJ is transferred to the demultiplexer DXG1/I (gate Pa2). It is thus seen that this synchronous half-connection controls a bi-directional transfer of messages concerning the channel *x* between the group G1 and the junctor J5. At time *t*Ay, the code Ctx, read previously at time *t*Sx in the address *y* of MCT, selects the address *x* of MDJ and the code Cty selects the address *y* of MDG2/P. The bi-directional transfer of messages is then carried out between these two memories setting up an asynchronous half-connection G2:*ty*/J5 similar to the synchronous half-connection.

The demultiplexing circuit DXG2/P assigned to the outgoing lines N2s, N4s, N6s, N8s comprises:

The input register RMP in which the codes delivered by the switching network over the group of conductors Ud are stored for the logical condition *t*Ay.*d*2 (gates Pa4 and Pa6).

The shift registers RN2 . . . RN8 assigned respectively to the outgoing lines N2s . . . N8s. The code stored in the register RMP is transferred in parallel in one of these registers at an odd digit time slot reserved to this trunk and it is transmitted in series form over the outgoing line under the control of the fine time signals *c*.

The operation of this demultiplexing circuit will described now, in relation with the FIGS. 6.*a* to 6.*e*.

FIG. 6.a represents three consecutive times *t*Ay, *t*S(*y* + 1), *t*A(*y* + 1). The FIGS. 6.*b* to 6.*e* represent the different operations which are carried out in these circuits and which are shown symbolically by the inscriptions located on the left hand side of said figures. These operations are:

(MDJ, *y*)Tf(RDJ): Transfer in RDJ of the message read in the line *y* of MDJ at time *t*Ay.*b* (FIG. 6.*b*). This message is the one which must be transmitted over the outgoing line.

(RDJ) Tf(RMP): Transfer of the content of RDJ in RMP at time *t*Ay.*d*2 (FIG. 6.*c*).

(RMP)Tf(RJ): Transfer of the content of RMP in one of the registers RN2, RN4, RN6, RN8 at the fine time *b* (FIG. 6.*d*) of the digit time slot reserved to the trunk to which belongs the channel *y*.

Z(RMP): Clearing of the register RMA at the time *t*A.*c* (FIG. 6.*e*)

Z(RDJ): Clearing of the register RDJ at the fine time *a* (FIG.6.*f*).

It has been seen previously that, when constituting the supermultiplex, we associated the digit time slots *m*1, *m*2, *m*3 . . . *m*8 to the incoming lines N1e, N2e, N3e . . . N8e of the trunks. If for instance, the asynchronous connection is set up between the junctor J5 and the channel V1.N2, one has *t*Ay = *t*A1 = *m*2 (see Table 3). A message is thus received, on the incoming channel V1.N2e, at time *m*2 and the message which must be transmitted over the outgoing channel V1.N2s is stored in RMA in *m*2.*d*2 (FIG. 6.*c*). The messages are thus transferred into RN at times *m*3, *m*5, *m*7, *m*1, respectively, for the trunks N2, N4, N6, N8.

The demultiplexing circuit DXG2/I is absolutely identical to the circuit DXG1/P and its shift registers RN1, RN3, RN5, RN7 receive the messages respectively in *m*2, *m*4, *m*6, *m*8.

4. SPACE SWITCHING

One has just described, in relation with FIGS. 5 and 6, the way of achievement of the space switching by taking into account only the group data memories and the demultiplexers concerned by the connection G1:*tx*/J5/G2:*ty*. The messages related to this connection occupy only one address in each one of the data memories and the other addresses of the data memories may contain messages which transit through other junctors. In order to control the access of these junctors, one carries out a space switching between the groups of trucks and the junctors, these switchings being shown symbolically in FIG. 5, by the AND circuits Pa1 to Pa4.

FIG. 7 represents a multiselector which is the basic circuit used for the space switching. It comprises *h* inlets and *v* outlets each one comprising 2*p* = 16 conductors for the bi-directional transfer, in parallel form, of eight-digit messages. At each crosspoint between an inlet and an outlet, 16 AND circuits have been placed constituting a multiple gate shown symbolically by a point. Each one of the *h* gates associated to a given outlet, the outlet 1 for instance, is controlled by one of the *h* signals supplied by the decoder DS1. The codes applied to this decoder are delivered either by the synchronous space path memory MSS or by the asynchronous space path memory MSA comprising each *g*/2 lines. The memory MSS contains the codes assuring the space selection for the synchronous half-connection and the memory MSA contains the codes assuring the selection for the asynchronous half-connection.

As for the memories described in relation with FIG. 5, the selection is carried out cyclically (codes Ct.*t*S) in both space path memories, and the codes read are transferred, at the fine time *b*, in the registers RSS1, RSA1. The code stored in RSS1 is applied at time *t*S to the decoder DS1 and this register is cleared at the next fine time *a*. The code stored in RSA1 is applied at time *t*A to this same decoder and the register is cleared at the next fine time *a* (in *t*S.*a*).

Thus, if one considers the line 1 of each one of the two memories associated to the outlet 1 of the multiselector, they are read simultaneously in *t*S1. The code read in MSS controls the closing of one crosspoint among *h* at this same time *t*S1 and the code read in MSA controls the closing of a crosspoint in *t*A1.

FIG. 8 represents a switching network comprising two selection stages Q', Q. Each stage comprises eight multiselectors Q'1 to Q'8, Q1 to Q8. This network has, by way of an example, as many inlets as there are outlets and thus carries out only a mixing according to the well known mode of interconnection. A supergroup SG1 . . . SG8 is connected to the inlets of each multiselector of the stage Q'. A superjunctor SJ1 . . . SJ8 is connected to the outlets of each multiselector. On this FIG. 8, a square located at the left hand lower part of each outlet shows symbolically the space path selection circuit which has been described in relation with FIG. 7.

As it has been described in the patent referenced(b), the time and space selection codes which are supplied by the computer CP may be written in the suitable addresses by several means and in particular by means of a marker MKR. It will be noted that these codes are as well address codes as zero codes controlling the clearing of an address code. Thus such an operation will be called further on "code modification".

Under these conditions, if one considers the connection SG1.1:*t*SxSJ2/SG8.2:*t*Ay (see Table 2 for the definition of the references) established through the switching network of FIG. 8, the circuit MKR must carry out, in order to write the codes characterizing each one of the half-connections, three different selections : a space path memory selection in the stage Q', a space path memory selection in the stage Q and a junctor selection.

According to a feature of the invention, one carries out a horizontal grouping of the memories in each junctor which consists in associating to the memories MCT and MDJ of a junctor, the junctor J1 for instance, the memories MSS, MSS', MSA as shown in FIG. 9, MSA' associated to the outlets 1 of the multiselectors Q'1 and Q1.

It will be reminded that all these memories are cyclically read under the control of the codes Ct.*t*S and that they have the same number of lines vizus *g*/2 = 96 so that they may be physically grouped as it is shown on FIG. 9 and they may use the same selection decoder DJR. The choice of the codes which must be read is carried out at the level of the output registers.

With a switching network as that described in relation with FIG. 8, a synchronous half-connection Sw or an asynchronous half-connection Aw uses two crosspoints in each stage of selection.

FIG. 10 is the "unfolded" symbolic representation of the connection considered previously by way of an example. It is seen that this connection takes into account data and path memories located in three different superjunctors and, more particularly, the junctors SJ2.5, SJ1.2 and SJ8.2 : with the horizontal grouping, only three selections, at most, are needed for writing the codes characterizing the connection.

5. MODES OF CONNECTION OF THE TRUNKS

In the organization of the switching center which has been described hereabove in paragraph 2 and in relation with FIG. 3, the trunks were specialized, according to the direction of propagation of a call, into calling trunks connected to a junctor at a time *t*S (odd trunks according to Table 3) and in called trunks connected to a junctor at a time *t*A (even trunks). In this organization, each group of trunks such as SG1.1, SG1.2, etc. is connected to one inlet of a multiselector of the stage Q' as it is indicated on FIG. 8.

As an alternative one associates, with the switching network, nonspecialized trunks which may be connected to a junctor either at a time *t*S or at a time *t*A. FIG. 11 represents, for this alternative, the mode of connection of the memory MDG to the switching network. It is seen that these memories MDG/I (odd trunk data memory) AND MDG/P (even trunk data memory) have separate accesses to the inlets of the multiselector state Q'. The connection in this multiselector being set up separately for each one of them under the control of a space path memory MSS or MSA, it is no more necessary as in the circuit of FIG. 3, to place gates on the outputs of the registers RGI and RGP.

At a given time *t*S, in *t*S5 for instance, the messages stored in the line 5 of both memories are transferred into the registers RGI, RGP and each of these messages may be transmitted, through the switching network, either in *t*S5 or in *t*A5. The clearing of the registers is carried out at each time *t*S.a.

6. TYPES OF HALF-CONNECTIONS

In the chapters 3 and 4 one has described the establishment of a conventional connection between the channel *x* of the group SG1.1 and a channel of the group SG8.2. For this connection, the FIG. 10 shows the localization of the group and path memories involved in the time and space switchings.

This conventional connection comprises two half-connections which will be called traffic half-connections which are of the type Sw or Aw (see FIG. 10).

The switching Half-Connection according to the invention enables to set up several other types of connections which will be described, by way of example, in the case where the switching center is a PCM telephone exchange. 6.1 - Tone Half-connection It is a synchronous half-connection (half-connection of type St) or an asynchronous one (half-connection of type At) which connects the channel *x* of a group to a digital tone source located in a junctor. It is unidirectional, i.e. it transmits only the tone from the junctor towards the subscriber.

FIG. 12 represents the diagram of the time switching circuit of a junctor which is a more complete diagram than The one of FIG. 5 and in which one has shown several tone sources TN1, TN2, etc. selected by codes interpreted in the decoder DTJ.

When such a source receives a control signal, it delivers a digital tone which is transmitted towards the demultiplexer of the considered group (OR circuit Pa7).

In order to identify such a half-connection, a particular information is stored in one of the memories MDJ or MCT according to whether it must be of the type St or At.

The Table 4 indicates thus, lines 1 and 2, the identification data stored in these memories.

When such and information is read, it controls the elaboration of a switching signal (Table 4, line 3) which controls either the transmission of a tone or the normal operation of a junctor.

TABLE 4

Identification of the different types of half-connections

| Identifica-tions means | Signal | Type of half-connection | Logical condition |
|---|---|---|---|
| 1 In memory MDJ | $\overline{B9}$ | Sw or Aw | |
| | B9 | St | |
| 2 In memory MCT | A12 | Aw | A12=A1+A2 |
| | $\overline{A12}$ | At | |
| 3 Switching signals in the junctor | Rt | St or At | Rt=B9·tS+A12·tA |
| | $\overline{Rt}$ | Aw or Sw | |
| | B9·tS | St | |
| | $\overline{A12}$·tA | At | |

The identification information is obtained in the following way:

a. For a synchronous half-connection : During the description of FIG. 5, it has been admitted that each line of the memory MDJ had a capacity of $p = 8$ digits which are referenced B1, B2 . . . B8. In fact, each line comprises one more digit or tone digit referenced B9. During a normal traffic connection, this digit is 0 (condition $\overline{B9}$) and its value is 1 (condition B9) when a synchronous tone half-connection St must be set up. The information B9 or $\overline{B9}$ is supplied by the register RDJ.

b. For an asynchronous half-connection : The time path memory MCT is normally provided for the storage of the time code Ct with seven digits A1, A2 . . . A7 such as it has been defined in paragraph 1. For the address selection in the memory MDJ comprising $g/2 = 96$ lines, it has been seen that one had the condition $A1 + A2 = A12$.

When an asynchronous tone half-connection At must be established in *t*Ay, one writes, on the corresponding line of MCT, the digits 0 in the position A1 and A2 and the decoder DCT supplies then, in *t*Sy and in *t*Ay, a signal $\overline{A12}$.

In the address which has thus been marked in MDJ or MCT, one writes a tone selection code Cn which occupies the positions B1 to B8 of MDJ or the positions A3 to A7 of MCT.

The switching signals (Table 4, line 3) act as follows:

a. Traffic half-connections Sw or Aw : For the memory MDJ, the reception of the messages coming from group memories and the transfer of messages towards the demultiplexers are controlled by the signal $\overline{Rt}$ (gates Pa5 and Pa6). Besides the asynchronous address selection in MDJ for a half-connection Aw occurs only for the logical condition A12.*t*A (gate Pa8).

b. Tone half-connection St : The code Cn read in MDJ selects the corresponding tone source for the logical condition B9.*t*S (gate Pa9). Besides, as the reading of this memory is destructive, the code Cn must be re-written at the same address at time *d*2 (gate Pa12 opened for the logical condition Rt).

C. Tone half-connection At : The code Cn read in MCT at time tSy selects the corresponding tone source for the logical condition $\overline{A12}$.*t*A (gate Pa10). This code has not to be re-written as this memory is not of the NDRO type.

At this same time *t*Sy, the address *y* of MDJ is read and it may contain a code or a message concerning another half-connection. This code must thus be kept and this is the reason why the re-writing is carried out under the control of the signal Rt (gate Pa12).

6.2 Supervisory Half-Connections calling channel

In a tandem or toll type central exchange associated to a network using a step by step numbering, a part of the numbering received on the calling channel may be transmitted directly over the called trunk. In this case, it is necessary that a supervision unit SU, the description of which is beyond the scope of the invention, should be connected at a point of the speech path in order to supervise the transmission of the digits. It will be assumed, by way of example, that this unit is constituted by the address *z* of a memory similar to a data memory.

FIG. 13 is a symbolic representation, similar to that of FIG. 10, of a first mode of achievement of a supervisory half-connection. In order to simplify the figure, one has shown only the memories MDJ of the concerned junctors.

As in the example taken for the description of the switching, we suppose that channel *x* of SG1.1 is calling. The half-connections G1:*t*x/J5 and J5/G2:ty are thus, respectively, of the Sw and Aw type.

In order to supervise this connection G1:*t*Sx/J5/G2:*t*Ay, a junctor is then searched, such as SJ3.2, in which the line *x* is free at times *tx* and *tz* and one establishes, from this junctor, a half-connection G1:*t*Sx/J2 by closing a crosspoint located on the vertical of the multiselector Q'1 which has access to the multiselector Q3 associated to the superjunctor SJ3. The half-connection J2/SU:*t*Az is an Aw traffic half-connection.

As an alternative, the supervision half-connection may be connected on a freee vertical of multiselector Q2.

It will be noted that this may be extended to all the junctors of SJ2 by making connections to all the verticals of Q2. One has thus a multiple half-connection with access to the lines x of all the junctors of the superjunctor.

7. GROUPING OF THE MEMORIES

It has been seen in paragraph 4 that, according to a feature of the invention, one had carried out a horizontal grouping of the memories (see FIGS. 8 and 9).

The memories located in a junctor (see FIG. 9) constitute an extension unit which groups the memories associated to a vertical of a multiselector in each selection stage. In order to decrease the number of conductors between the junctors and the two multiselectors, the decoder, DS1 (FIG. 7) for instance, is not included in the extension unit and is associated to the vertical.

It is thus realized that, if it is required to increase the capacity of the switching network, it is sufficient to add extension units if the free inlets and outlets corresponding in the network have been provided for.

The extension unit constitutes a block presenting a certain independence of operation. In fact, it comprises first an independent supply source and second the time base described in relation with FIG. 2 and which receives, from the main clock, only the signals H and the framing signal Sy1.

It is thus seen that this concept of extension unit improves the reliability of the switching network as a defect in this unit reduces only by a low ratio the traffic capacity of said network.

Besides, it will be reminded that it has been shown, in paragraph 4, that the horizontal grouping of the memories enabled to reduce the number of selections for an operation of code modification.

In the path search, for setting up for instance the calling half-connection SG1.1:*t*Sx, the computer CP must first search for a free junctor at this time *t*Sx. If we suppose that one of the free junctors is SJ1.1 (see FIG. 3), this means that the outlet 1 of Q1 is free in *t*Sx : two informations are then available which indicate that the half-connection must be set up between the inlet 1 of Q'1 and the outlet 1 of Q1. The missing informations are the number of the outlet to be used in Q'1 and the number of the inlet of Q1, i.e. the identity of the mesh connecting Q'1 and Q1. As it is well known this information may be supplied by a network map or mesh table constituted by a read-only memory associated by the computer CP.

FIG. 14 represents an alternative mode of memory grouping which will be called mesh-grouping. In this type of grouping, we locate in the junctor, such as SJ8.1, the space path memories associated to the outlet 1 of Q8 and to the outlet 8 of Q'1, said outlet being one of the ends of the mesh connecting Q'1 to Q8.

Under these conditions, if the half-connection must be set up between SG1.1 and SJ8.1, the knowledge of the code identifying SJ8.1 gives immediately the missing information as the number "1" identifies the multiselector Q'1 and the inlet Q8 and that the number "8" identifies the outlet used in Q'1. It is thus not necessary to use mesh tables in this type of grouping.

Although the present invention has been described in relation with a particular example of achievement, it is clear that it is not limited to the said example and that it may be applied to other alternatives or modifications while remaining within its scope.

We claim:

1. A time multiplex PCM data switching center for setting up a plurality of connection such as a connection between one calling channel to one channel in a called trunk by simultaneously performing two space switchings, one for each channel in a connection, and for allowing the bi-directional transfer of messages between each of these channels and a junctor common to both channels, and address storage means in said junctor for matching the time positions of the two channels, a plurality of incoming and outgoing channels of a trunk each having an address comprised of plural digits, means for writing messages received at each frame in a parallel form at the addresses which are assigned to the channels in a group data memory which is associated with the input side of one of a plurality of multiselectors of a first space selection stage, the outlets of these multiselectors being connected to the inlets of the multiselectors of a second selection stage and further being connected to said junctor in which the time switching is performed, the selection of a crosspoint associated with an outlet controlled by a code written at one of the addresses of a space path memory with cyclic readout, each junctor comprising a data memory with each of said addresses being selected at each frame once in a cyclic way and once in an acyclic way, and further comprising a time path memory with addresses which are cyclically selected and which supplies the codes enabling the acyclic selection of the data memory and wherein the addresses of a data memory are distributed in two submemories each comprising addresses composed of a plurality of bits assigned respectively to the messages received over odd and even trunks, and the outlet of each one of these memories being connected to one inlet of a multiselector of the stage such that each channel may be connected to a junctor, either at the cyclic or at an acyclic time.

* * * * *